Dec. 29, 1953   A. M. MOOS   2,664,511
DOSIMETER
Filed Nov. 1, 1949
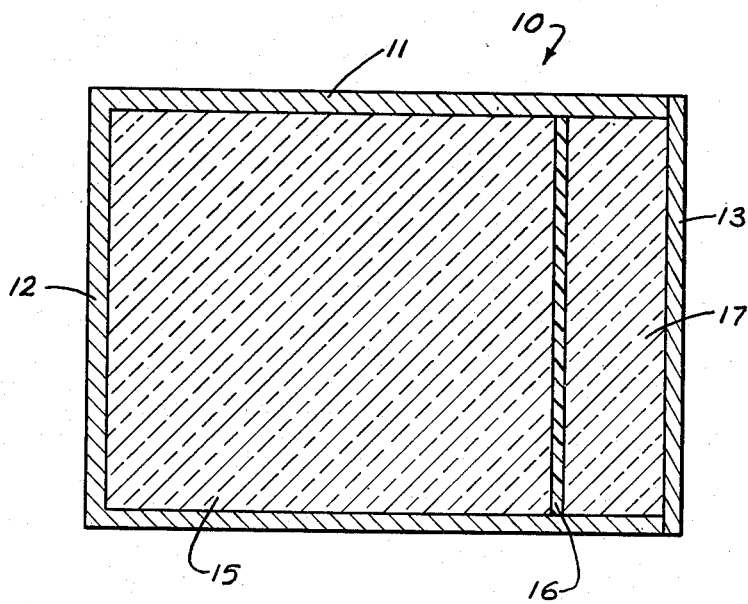
INVENTOR.
ANTHONY M. MOOS
BY
ATTORNEY Patented Dec. 29, 1953

2,664,511

UNITED STATES PATENT OFFICE 2,664,511

DOSIMETER

Anthony M. Moos, Hillsdale, N. J., assignor to Patterson, Moos & Company, Inc., Long Island City, N. Y., a corporation of New York Application November 1, 1949, Serial No. 124,910

5 Claims. (Cl. 250—71)

The present invention relates to the field of radiation measurement and indication and more especially to the measurement and indication of gamma radiation by means of a compact, easily portable dosimeter suitable for carrying on the person.

Heretofore, the personal dosimeter has been a modification of conventional laboratory instruments such as the ionization chamber or the photographic film badge. The ionization chamber is costly, fragile and bulky, and is, therefore, not well suited to individual personal use. The film badge, while ideal with respect to size and weight, is not readily readable, since after exposure it must be developed and the film calibrated against standard exposed films representative of different radiation dosage.

The present invention comprises a system including a gamma ray sensitive phosphor coated with a photochemically active layer, the absorption band of which matches the emission band of the phosphor. Preferably, the phosphor is in the form of a single crystal sensitive to gamma radiation and transparent to its own luminescence emission.

The dosimeter of the present invention, while capable of measuring dosages of low and intermediate values, is ideally suited for measurements of high order dosages up to 1000 r.

By means of the present invention there is provided a compact, energy independent, self-contained, personal dosimeter which can be easily read by the wearer, and which gives a clear indication of dose upon inspection.

It is an object of the present invention to provide a portable gamma ray dosimeter which is energy-independent and which gives an immediate indication of dose upon inspection.

It is a further object of the present invention to provide a gamma ray dosimeter which indicates dosage by means of a chromatic photochemical reaction.

Other objects of the present invention include the provision of a gamma ray dosimeter of simple, compact construction that can be manufactured in large volume at low cost and the provision of a gamma ray photochemical dosimeter that is effective over wide temperature ranges.

Other objects of the present invention will become clear from a reading of the following specification when taken in conjunction with the attached drawing, wherein the single figure shown is a longitudinal sectional view of one embodiment of the novel dosimeter.

Having reference to the drawing, 10 designates a metal housing of lead, silver, or cadmium having a cylindrical body section 11, an integral end section 12, and a removable end face 13 mounted to the body member 11 by any conventional means such as screw threads.

Within the housing 10 are mounted a single crystal 15 of naphthalene, anthracene, fluorene, calcium tungstate, thallium bromide-iodide or the like, and a thin separator 16 of cellulose acetate or the like, and a layer 17 of photosensitive material such as silver nitrate sorbed on zinc oxide, pararosaniline, leucocyanide dispersed in polyvinyl alcohol, pyridine and paraphenylenediamine hydrochloride, paraphenylenediamine nitrate, or molybdic acid and dextrose suspended in polyvinyl alcohol. The photosensitive layer may be dispersed through a suitable transparent or translucent binding material such as a titanium oxide gel.

While housing 10 acts as a protective container for the components of the dosimeter, its material and thickness are designed to exclude alpha and beta particles and radiation of wave lengths longer than gamma rays and to increase the effectiveness of the crystal by absorbing gamma radiation, thus making the system energy-independent below 0.5 m. e. v. (See "Photographic Film as a Pocket Radiation Dosimeter" by Pardue, Goldstein and Wollan, document MDDC-1065 of AEC.)

The wave lengths of gamma radiation fall between $10^{-8}$ and $10^{-12}$ centimeters. The crystal 15 absorbs such radiation and converts it into radiation of much longer wave lengths, to which longer wave lengths the crystal is permeable, so that the converted radiations are transmitted to the photochemical layer 17 which, absorbing this energy, gives a photochemical reaction.

The emission band of crystal 15 may lie between wave lengths of $10^{-4}$ to $10^{-8}$ centimeters. By having the photochemical layer 17 absorptive to the emitted light, a permanent chromatic reaction can be expected so that the dosage will be represented visibly by a change of color.

The chromatic effect may be achieved by several different approaches. Silver nitrate in the presence of titanium oxide, upon ultra violet irradiation will be darkened. Molybdic acid in the presence of a reducing agent such as dextrose will form a blue suboxide upon irradiation.

Certain crystals will, upon irradiation by gamma rays, emit rays not only in the ultra violet band but in the broader actinic band including ultra violet and longer wave length visible light. The photosensitive layer can be made chromatically responsive to luminescence by proper choice of photochemical reactants.

Powdered gamma ray sensitive phosphors can be used in place of the single crystal phosphor. The visible or ultra violet light produced by such materials is scattered and the resultant increased paths lead to considerable absorption by the material itself, so that the large single crystal phosphor represents a more efficient source of emission.

The drawing is intended to show one physical embodiment of the present invention, but it will be appreciated that modifications may be made thereto without exceeding the scope of the present invention. For example, the crystal 15 can be coated or plated with a high reflecting material such as aluminum to cause the internal reflection of photons that might otherwise escape from the surface of the crystal. Also by suitably shaping the crystal and housing, increased light emission may be expected.

The present invention contemplates the use of a gamma ray sensitive phosphor of such character as to obtain the highest possible quantum yield of emitted energy. This is achieved by use of a gamma ray sensitive phosphor having high quantum yield with respect to its mass and high transparency to its emission band. A flat layer of powdered phosphor or a relatively small single crystal will give a low quantum yield due to scattering and internal reflections and due to small absorption of the gamma radiation. A group of such small crystals will not compare as favorably as a single crystal of appreciable depth with respect to width or diameter, since in the latter structure the internal reflections are minimized and the absorption of gamma rays increased with the depth of the crystal. The greater the gamma ray absorption, the greater is the energy yield in emitted radiation.

While the specification points out only a few examples of the present invention and the drawing shows only one physical embodiment thereof, it will be understood that the invention is not restricted thereby, but solely by the scope of the appended claims.

What is claimed is:

1. A dosimeter for gamma radiation comprising a crystal fluorescent to gamma radiation and a coating of photochemically sensitive material, said material including agents chromatically sensitive to the fluorescent energy emitted by said crystal.

2. A colorimetric dosimeter for gamma radiation comprising a gamma ray sensitive single crystal phosphor permeable to its own light emission, in proximity thereto a layer of material photochemically sensitive to the phosphor emission, said material including an agent chromatically sensitive to said phosphor emission, and a metallic housing including a removable face abutting said layer, said housing completely enclosing said crystal and said layer and being permeable to gamma radiation but impermeable to actinic light.

3. A colorimetric dosimeter for gamma radiation comprising a crystal phosphor having a significantly high linear absorption coefficient for gamma radiation and permeable to its own emission radiation, in proximity thereto a material photo-chemically and chromatically sensitive to such emission radiation, and a housing including a removable face abutting said material, said housing completely enclosing said crystal and said material.

4. A colorimetric dosimeter for gamma radiation comprising a crystal phosphor having a significantly high linear absorption coefficient for gamma radiation and permeable to its own emission radiation, in proximity thereto a material photochemically and chromatically sensitive to such emission radiation and a metallic housing completely enclosing said crystal phosphors and said material and being opaque to the radiation emitted by said phosphor.

5. A colorimetric dosimeter for gamma radiation comprising a single crystal having fluorescent properties, in proximity thereto a layer of photosensitive material having a quantum yield of one or greater in the region corresponding to the emission band of the crystal, said layer including an agent chromatically responsive to the energy within the emission band of said crystal, and a metallic housing including a removable face adjacent said layer, said housing completely enclosing said crystal and said layer and being permeable to gamma radiation but opaque to beta and alpha particles and to radiations of the order of the absorption band of the photo-sensitive layer.

ANTHONY M. MOOS.

References Cited in the file of this patent

UNITED STATES PATENTS

| Number | Name | Date |
|---|---|---|
| 2,120,908 | Raney | June 14, 1938 |
| 2,279,023 | Kallman et al. | Apr. 7, 1942 |
| 2,297,478 | Kallman et al. | Sept. 29, 1942 |
| 2,387,887 | Dimsdale et al. | Oct. 30, 1945 |
| 2,483,991 | Wollan et al. | Oct. 4, 1949 |
| 2,585,551 | Hofstadter | Feb. 12, 1952 |

FOREIGN PATENTS

| Number | Country | Date |
|---|---|---|
| 17,666 | Great Britain | Sept. 24, 1903 |

OTHER REFERENCES

Scintillation Counting with Anthracene, AECD, 1889, pp. 1–6, Apr. 20, 1948.

Atomic Energy Commission Document AECD 2353, Aug. 31, 1948.